US006328294B1

(12) United States Patent
Palinkas

(10) Patent No.: US 6,328,294 B1
(45) Date of Patent: Dec. 11, 2001

(54) ELASTOMERIC SPRING SYSTEM

(75) Inventor: Richard L. Palinkas, Northfield, CT (US)

(73) Assignee: CK Witco Corporation, Middlebury, CT (US)

( * ) Notice: Subject to any disclaimer, the term of this patent is extended or adjusted under 35 U.S.C. 154(b) by 0 days.

(21) Appl. No.: 09/431,838

(22) Filed: Nov. 2, 1999

(51) Int. Cl.[7] .......................................................... F16F 3/08

(52) U.S. Cl. ....................... 267/153; 267/292; 267/140.3; 267/141

(58) Field of Search ..................................... 267/292, 293, 267/294, 220, 152, 153, 141, 201, 140, 140.3, 207, 141.1, 134, 135; 188/268, 129, 381; 280/275, 283, 284, 276; 213/44, 45, 41, 40 R, 221; 248/638; 293/136; 244/104 R

(56) References Cited

U.S. PATENT DOCUMENTS

| | | | | |
|---|---|---|---|---|
| 3,831,923 | * | 8/1974 | Meldrum | 267/141 |
| 3,993,295 | * | 11/1976 | Suzuki et al. | 267/153 |
| 4,085,832 | * | 4/1978 | Gaines et al. | 188/268 |
| 4,176,714 | * | 12/1979 | Case | 267/153 |
| 4,348,015 | * | 9/1982 | Domer | 267/153 |
| 4,560,150 | * | 12/1985 | Shtarkman | 188/268 |
| 4,962,916 | * | 10/1990 | Palinkas | 267/153 |
| 5,118,086 | * | 6/1992 | Stevenson et al. | 267/141.1 |
| 5,257,730 | * | 11/1993 | Nakaura | 267/220 |
| 5,460,357 | * | 10/1995 | Stewart | 267/153 |
| 5,529,327 | * | 6/1996 | Huang | 280/276 |
| 6,017,044 | * | 1/2000 | Kawagoe . | |

* cited by examiner

*Primary Examiner*—Douglas C. Butler
(74) *Attorney, Agent, or Firm*—Raymond D. Thompson

(57) ABSTRACT

An elastomeric spring system having non-linear force-deflection characteristics and low rebound is provided. The system comprises a housing and a plurality of first and second spring members movably disposed in alternating relationship within a bore defined by the housing. The first and second spring members are preferably formed from polyurethane such as the two part castable urethanes made from polyether-isocyanate or polyester-isocyanate prepolymers cured with organic diamine or polyol materials. When subject to a force along the axis of deflection, the first spring member is adapted to expand and progressively envelope the second spring members until the hemispherical ends of two of the first spring members meet within the first spring member, thereby causing the force-deflection characteristics of the spring to be nonlinear.

9 Claims, 1 Drawing Sheet

ELASTOMERIC SPRING SYSTEM

FIELD OF THE PRESENT INVENTION

The present invention relates to an elastomeric spring system and more particularly to an elastomeric spring system having non-linear force-deflection response characteristics and low rebound.

BACKGROUND OF THE PRESENT INVENTION

Most motor vehicles incorporate suspension systems that employ struts. Generally, associated with these struts is a hydraulic damper or shock absorber having a telescoping rod extending therefrom. During operation, the telescoping rod moves into and out of a shell forming part of the shock absorber. As the rod nears the end of its travel, a point referred to by those skilled in the pertinent art to which the invention pertains as "full jounce", an auxiliary spring retards the rod's travel by engaging the shock absorber gradually slowing, and then stopping the rod's motion. It is important that the auxiliary spring decelerates and stops the rod's retrograde motion in a manner that ensures a smooth ride for the vehicle.

In order to effect the above-described retardation of the rod's motion in as smooth a manner as is possible, it is desirable that the auxiliary spring exhibit characteristics consistent with a variable or non-linear spring rate.

In general, known auxiliary springs are elastomeric and of various shapes and configurations, and most are fabricated from rubber which, at best, displays a spring rate curve having two distinct deflections, but which does not behave in a non-linear manner.

In addition to motor vehicles, bicycles, especially those referred to as mountain bikes, often employ suspension systems for absorbing impact-type or shock loads. However, these suspension systems are often too stiff, providing inadequate shock absorption, or too soft, causing the same problem. It is difficult or even impossible to provide a suspension that can provide adequate shock absorption for a wide range of differing conditions. Accordingly, there is a need for a suspension system providing a range of shock absorbing properties adequate for accommodating a plurality of different terrain.

Spring systems comprised of solid elastomers have been proposed. U.S. Pat. No. 4,962,916 (the '916 patent) to Palinkas, assigned to the assignee of the present invention, and incorporated by reference herein in its entirety, discloses an elastomeric spring comprising hollow elastomeric tubes stacked upon one another with the axes of the tubes normal to the axis of deflection of the spring, thereby causing the assembly of tubes to exhibit multiple spring rates as they are compressed. Preferred materials for the tubes are two-part castable urethane prepared from polyether-isocyanate or polyester-isocyanate prepolymers cured with organic diamine or polyol materials.

In one embodiment of the invention described in the '916 patent, a first tube is employed that has a non-uniform wall thickness and defines a large outer diameter. A second tube is integrally molded onto the first tube and has a substantially uniform wall thickness defining a smaller outer diameter than the first tube. The first tube is positioned such that the thinnest of the non-uniform wall is adjacent to the second tube, allowing the first tube to roll over an outer peripheral surface of the second tube during compression of the spring. The above-described design provides a progressively changing spring rate whereby as the first tube collapses, a first spring rate is realized. Because of the location and configuration of the first tube, the initial spring rate is low. As the second tube is engaged and collapses, its configuration causes the spring rate to become higher and the spring stiffer. When the entire structure collapses, the spring is essentially solid and the spring rate is determined by the characteristics of elastomer from which the spring is made.

Based on the foregoing, it is the general object of the present invention to provide a spring for use in a vehicle or bicycle suspension system that overcomes the drawbacks and problems associated with known prior art suspension systems.

It is a more specific object of the present invention to provide a spring that finds utility, inter alia, in vehicle and bicycle suspension systems that exhibits a non-linear spring rate.

SUMMARY OF THE PRESENT INVENTION

The present invention resides in an elastomeric spring having non-linear force deflection characteristics that includes a housing having a bore extending at least partway therethrough and defining a bore axis. At least one radially deformable first spring member is slidably positioned and retained in the housing. At least one axially deformable second spring member is also slidably retained in the bore, coaxial with the first spring member with the first and second spring members being positioned in end-to-end relationship relative to each other.

The first spring member defines at least one opening adapted to receive at least a portion of the second spring member in response to an applied force having a component along the bore axis. During operation, the applied force causes the first spring member to progressively deform in a radial direction relative to the bore axis, thereby enveloping the second spring member. The configuration and manner of deformation of the first and second spring members causes the spring to exhibit a non-linear response to the applied force.

In the preferred embodiment of the present invention, a plurality of first and second elastomeric spring members are located in the housing bore in an alternating, end-to-end relationship relative to each other. Preferably, the first spring members are generally hollow and define an opening at opposed ends adapted to receive a corresponding end of the adjacent second spring member. The second spring members each define a generally cylindrical outer surface and hemispherical opposed end portions with a bore extending between the end portion longitudinally through the member. Each of the second spring members also defines a centering lip extending radially from the generally cylindrical outer surface.

When the spring is subjected to a force having a component along the bore axis, the second spring members progressively penetrate the bores defined by the first spring members. Depending on the magnitude of the force, the expansion of the radial first spring members and progressive envelopment of the second spring members is limited by contact between an end of the first spring members, and the centering members. Where no centering members are present, opposing second spring members—if the magnitude of the applied force is sufficient, will eventually contact one another within the bore of a first spring member. When subjected to further force, the first spring member continues to radially deform while the second spring members deform axially until further compression is not possible, and a substantially solid mass is formed. The above-described collapse of the first and second spring members causes the force-deflection characteristics of the overall spring to be non-linear.

DETAILED DESCRIPTION OF THE PREFERRED EMBODIMENT

Figure 1:
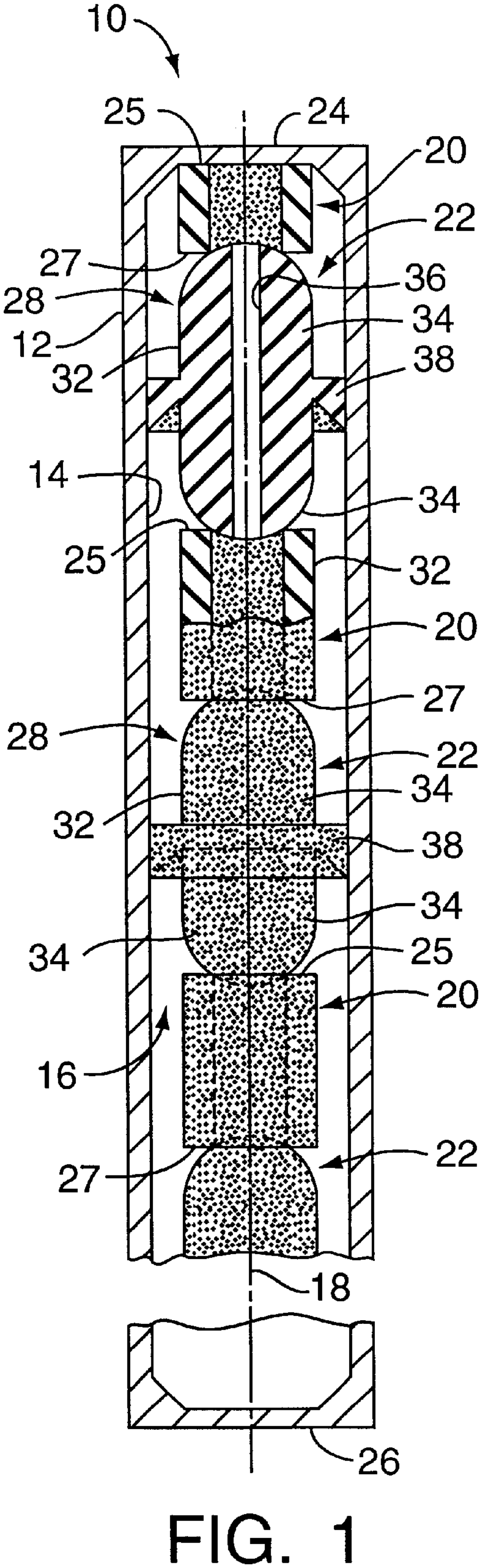
FIG. 1 is a cross-sectional view of an embodiment of the present elastomeric spring system.

FIG. 1 shows an embodiment of the present system 10 comprising a housing 12 having an interior wall 14 defining a bore 16 extending longitudinally therethrough and coaxial with a bore axis 18. A plurality of first and second spring members, 20 and 22, respectively, are slidably positioned in the bore in an alternating end-to-end relationship relative to each other. In the illustrated embodiment, the system 10 includes at least three sets of first and second spring members 20, 22 in alternating end-to-end relationships. However, the present invention is not limited in this regard as any number of first and second spring members required to achieve desired non-linear spring characteristics can be employed without departing from the broader aspects of the present invention.

Still referring to FIG. 1, the housing 12 is in the form of a generally cylindrical hollow tube having closed first and second ends, 24 and 26 respectively, but may assume any suitable configuration for the desired application. For example, the tube could have a square or rectangular cross-section, or the said first and second ends may be fully or partially closed or may taper so as to contain the first and second spring members 20 and 22 respectively.

In the preferred embodiment, the first spring members 20 comprise substantially hollow elastomeric cylinders, each having first and second open ends 25 and 27, respectively. As will be explained in detail hereinbelow, in response to a force having a component along the bore axis, the first spring members 20 are adapted to deform radially outwardly to receive and at least partially envelope the second spring members 22.

The adjacent second spring members 22 each define a substantially solid outer shell generally designated by the reference number 28. The outer shell 28 includes a cylindrical body section 32 and a pair of opposed hemispherical end sections 34. A bore 36 extends through each second spring member 22 between the end sections 34. A centering lip 38 projects radially outwardly from the cylindrical body section 32 and serves to guide the placement of the first and second spring members 20 and 22 within the bore of the housing 12. As discussed below, the centering lip 38 also serves to limit the amount by which the first spring member 20 can be enveloped by the second spring member 22 during compression of the spring 10.

Figure 2:
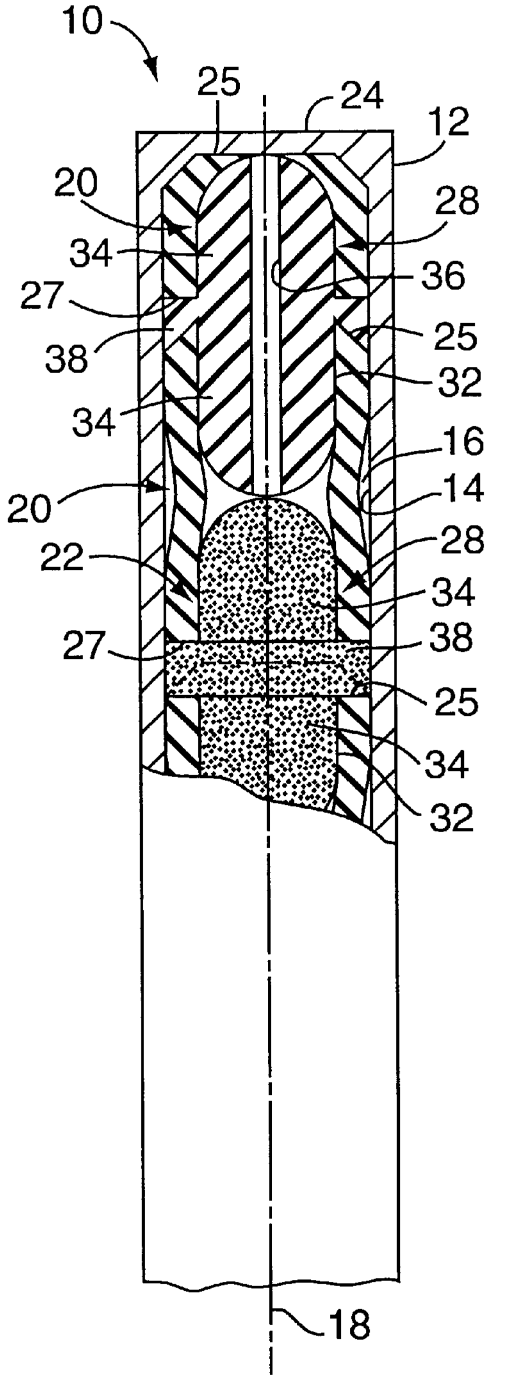
FIG. 2 is a partial cross-sectional view of the embodiment shown in FIG. 1 illustrating the effect of a force applied to the system.

As shown in FIG. 2, a force applied to the spring 10 along the bore axis causes the hemispherical end sections of the second spring members 22 to progressively push into an adjacent end of the first spring members 20, thereby causing the first spring members to deform generally radially outwardly from the bore axis. In this manner, the first spring members 20 progressively and reversibly envelope the second spring members 22 in response to the applied force. As the spring system 10 is further compressed, the hemispherical ends of opposing second spring members meet, and continued compression of the spring system 10 results in the axial deformation of the second spring members 22. The above-described spring deformation results in the spring 10 exhibiting a non-linear force-deflection response.

The first and second spring members of the present spring system are preferably formed using elastomeric materials having non-linear static and dynamic force deflection characteristics. Preferred materials are solid elastomers having a Shore D hardness of about 40 to about 55 Durometer. A more preferred hardness range is about 90 to about 98 Shore A, most preferably about 95 to about 97 Shore A.

Applications for the present invention include, but are not limited to, vehicular suspensions such as bicycle suspensions and automotive jounce bumpers. The elastomers suitable for strut jounce bumper applications ideally have excellent flex life at the high hardness range expressed above. Conventional thermosetting synthetic and natural rubbers do not have the requisite flex fatigue resistance at these high hardness levels. The elastomeric material must be capable of withstanding at least about 5,000, and preferably about 20,000 to about 100,000 full jounce cycles of deflection (full expansion of hollow elastomeric cylinders). Polyurethanes, both thermosetting and thermoplastic types, meet these criteria.

Among the polyurethanes, the two part castable urethane made from polyether-isocyanate or polyester-isocyanate prepolymers cured with organic diamine or polyol materials are most preferred as represented by materials such as Adiprene and Vibrathane (trademarks of Uniroyal Chemical Company).

There is some inaccuracy at the lower end of the Shore D range set out above so the hardness range can be alternatively expressed as a Durometer range of 90 (Shore A) up to about 55 (Shore D).

Various changes and modifications may be made to the elastomeric spring system as described herein without departure from the scope of the invention if such changes and modifications are within the scope of the appended claims or equivalent thereto.

What is claimed is:

1. A spring system having non-linear force-deflection response characteristics comprising:

a housing having a bore extending at least partway therethrough and defining a bore axis;

at least one radially outwardly deformable first spring member slidably retained in said bore coaxial with said bore axis;

at least one axially deformable second spring member slidably retained in said bore, coaxial with, and in end-to-end relationship with said first spring member;

said first spring member defining at least one opening adapted to receive at least a portion of said second spring member in response to an applied force having a component along said bore axis; and whereby in response to said force, said first spring member receiving said portion of said second spring member in said opening progressively deforms substantially radially outwardly relative to said bore axis enveloping at least a portion of said second spring member while said second spring member progressively deforms substantially parallel to said axis such that said spring system exhibits a non-linear response to said applied force.

2. The spring system of claim 1, wherein said housing is generally cylindrical.

3. The spring system of claim 1, wherein said first and second spring members are each formed from an elastomer having a Shore D hardness of about 40 to about 50 Durometer.

4. The spring system of claim 1, wherein said first and second spring members are each formed from an elastomer having a Shore A hardness of about 90 to about 98 Durometer.

5. The spring system of claim 1, wherein said first and second spring members are each formed from polyurethane.

6. The spring system of claim 5, wherein said first and second spring members are each formed from cast thermosetting polyurethane.

7. The spring system of claim 1, further comprising a centering lip projecting radially outwardly from said second spring member.

8. The spring system of claim 1, wherein said second spring member includes a generally cylindrical body section and a pair of axially opposed hemispherical end sections.

9. The spring system of claim 8, further comprising a centering lip projecting radially outwardly from said generally cylindrical body section.

* * * * *